Patented June 17, 1952

2,600,983

UNITED STATES PATENT OFFICE 2,600,983

COMPRESSION IGNITION POWER PLANT

Louis Frederick Rudston Fell, Littleover, and Richard Joseph Walsh Cousins, Shoreham-by-Sea, England, assignors to Fell Developments Limited, London, England, a British company Application August 11, 1949, Serial No. 109,635
In Great Britain August 26, 1948

15 Claims. (Cl. 74—472)

This invention relates to power plants having a main compression ignition engine which is supercharged by an independently driven blower, and is particularly but not exclusively applicable to multiple engine power plants of the type described in the specification of application No. 793,903, now Patent No. 2,589,788 issued March 18, 1952.

According to the present invention, a power plant having a main compression ignition engine supercharged by an independently driven blower is provided with control means for the main engine whereby a fuel injection control member is influenced by a governor through the intermediary of means adapted to give a predetermined torque/speed relationship in the operation of the main engine and is also influenced by a manual control to determine the upper torque limit at which the main engine operates.

A power plant according to the present invention can provide high torque at low speeds and is thus particularly suitable as the prime mover of a locomotive as described in application No. 793,903.

The governor is preferably a centrifugal governor which is arranged to give substantially equal movements of the governor pad for equal changes in engine speed.

The fuel injection control member referred to above is conveniently the pump rack of the fuel injection pump of the main engine.

Further features of the power plant according to the present invention include:

(a) Means to restrict fuel injection to the main engine until transmission gearing has been set to transmit a load.

(b) Means to give overload fuel injection for starting the main engine.

(c) Means to give automatic cut-off at a predetermined maximum speed to avoid over-running.

(d) Means for manual cut-off for stopping.

(e) Means to ensure that fuel injection is limited in accordance with the air available to the main engine.

Figure 1:
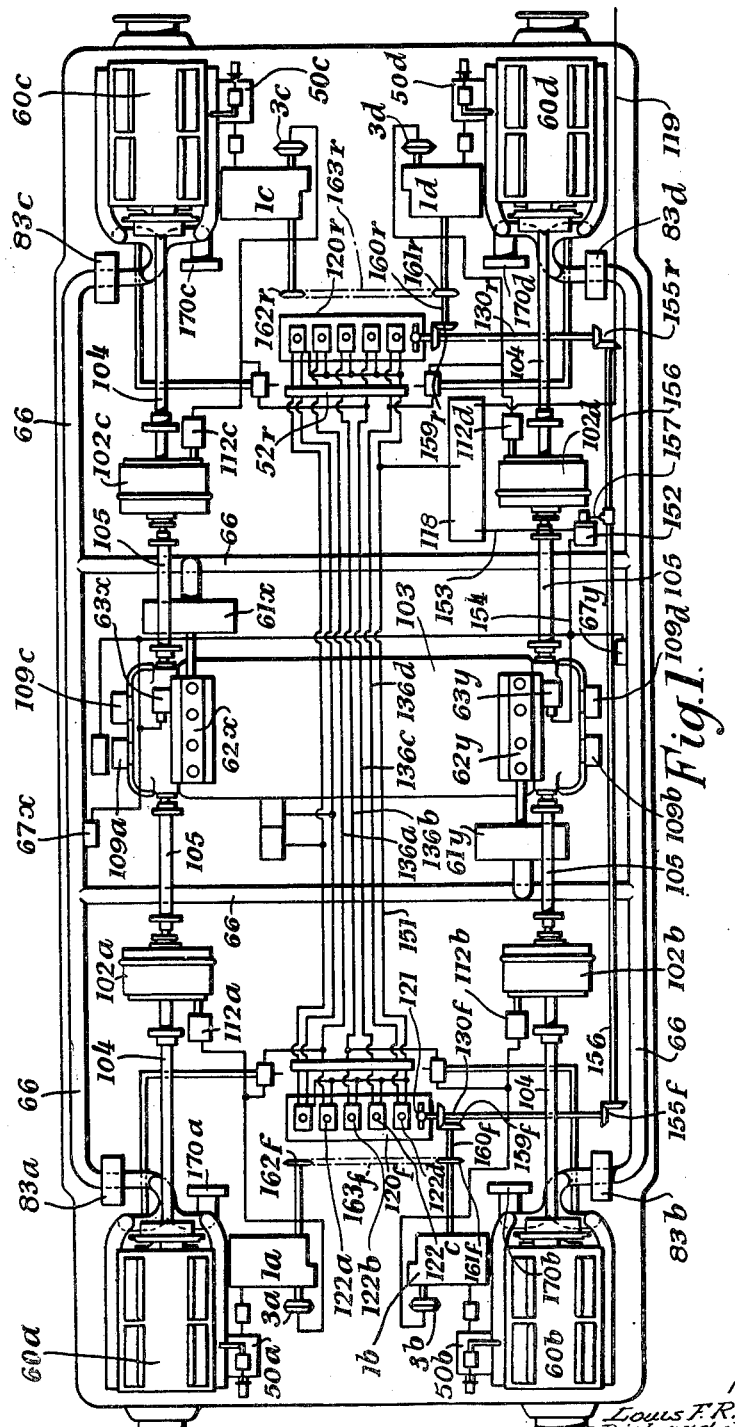

The invention further consists in the new or improved features, combinations and arrangements of parts embodied in the preferred form of the invention which it is now proposed to describe in some detail with reference to the accompanying drawings in which Figure 1 is a diagrammatic plan view, with the cowling removed, of a railway locomotive having a power plant in accordance with the present invention, the major compounds of which are arranged in substantially the same manner as in the power plant described in the aforesaid application No. 793,903, filed December 27, 1947, by Louis F. R. Fell.

Figure 2:
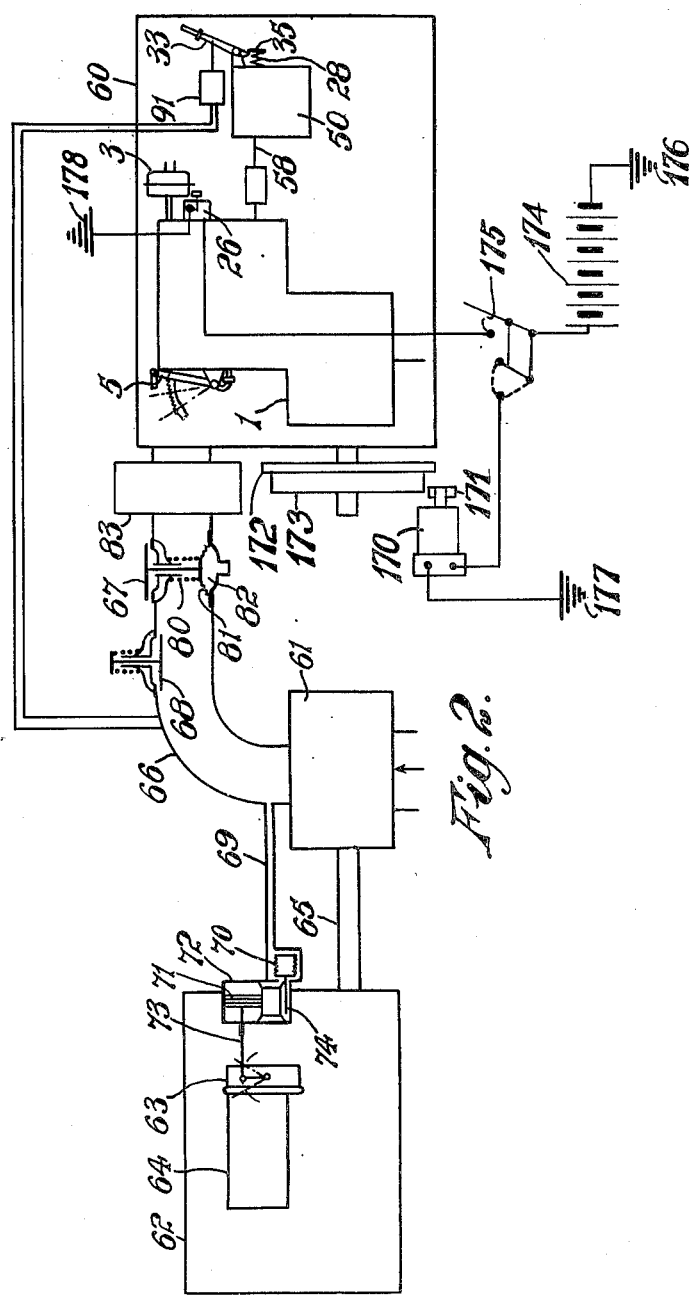
Figure 3:
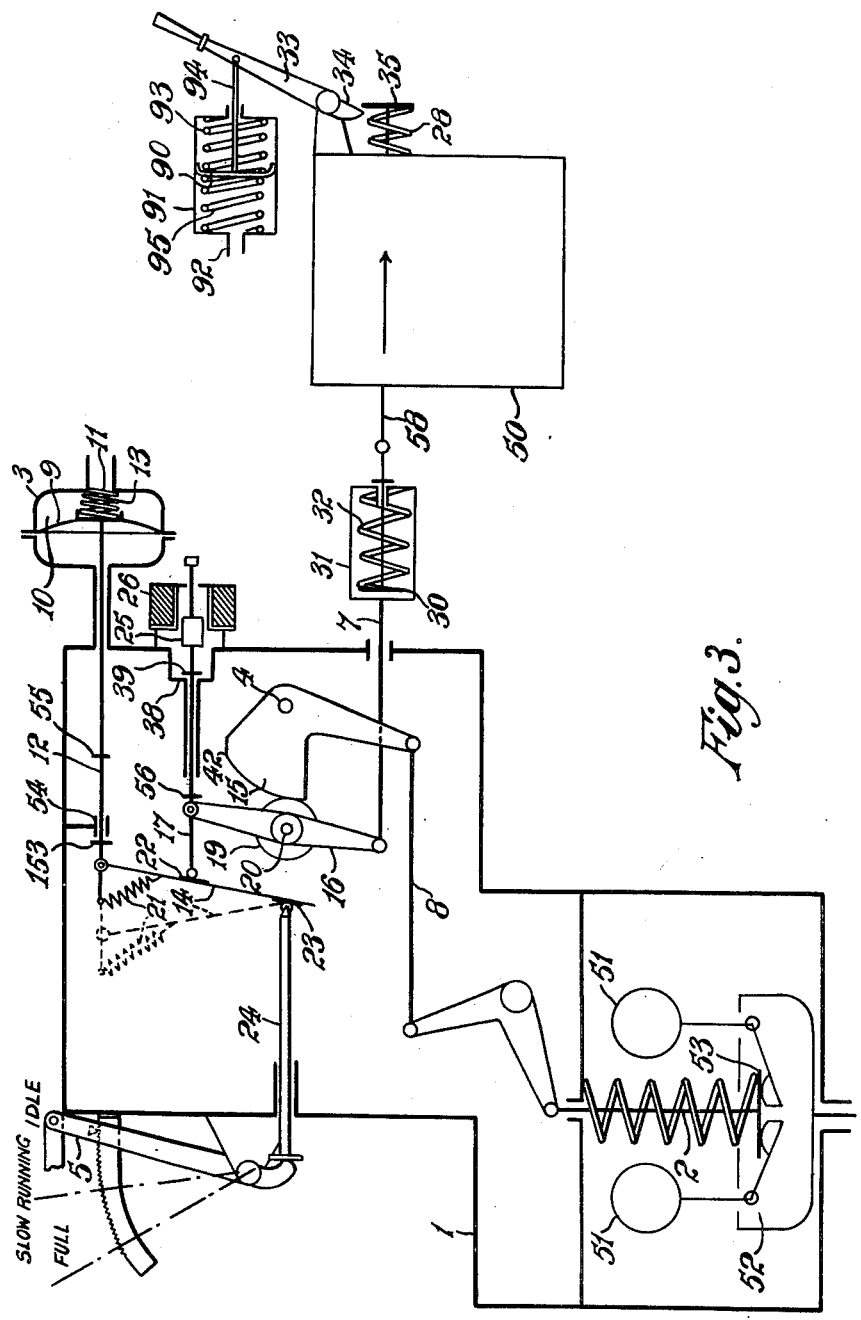
Figure 4:
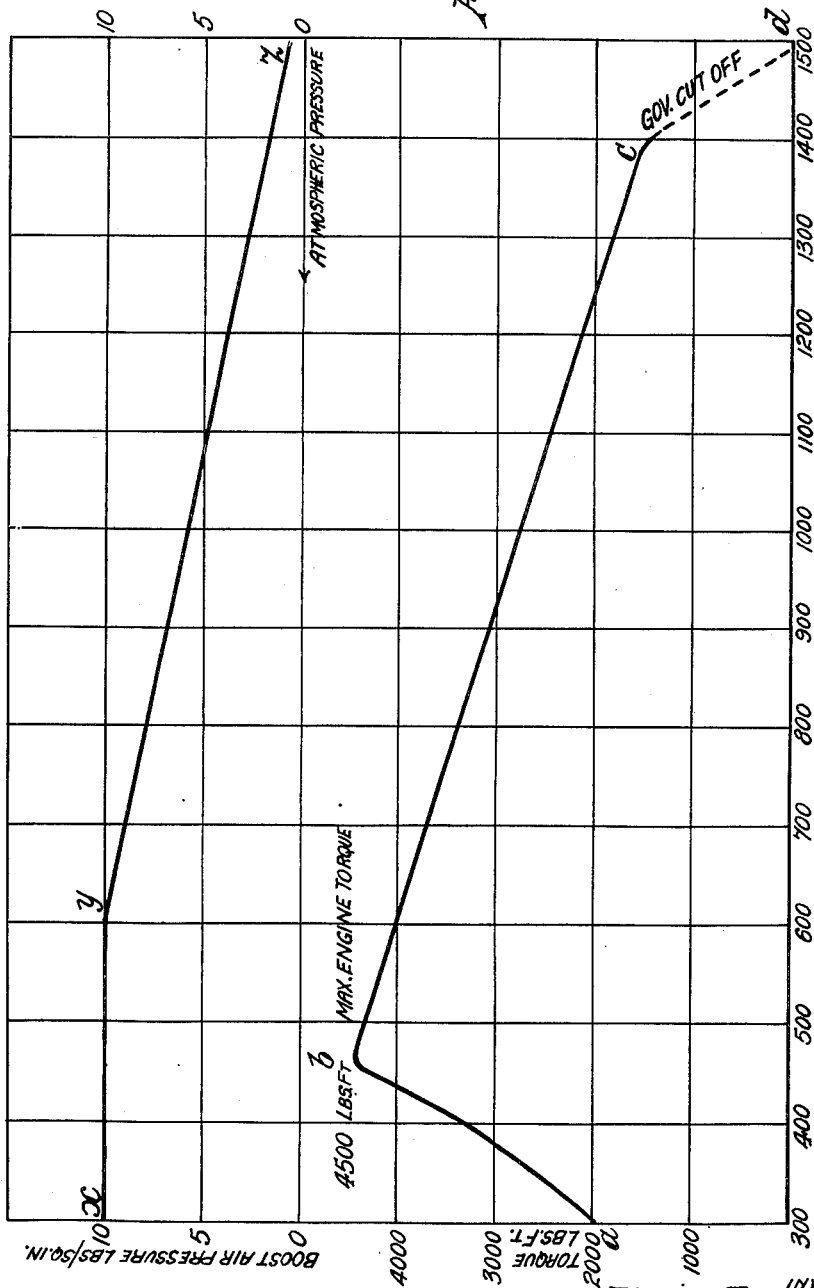

Figure 2 shows diagrammatically and in greater detail the principal components of a power plant as shown in Figure 1, only one main engine and one auxiliary engine being shown for the sake of simplicity and particular reference being made to the supercharging arrangements, Figure 3 shows diagrammatically the arrangement of the control means associated with a power plant of Figure 2, and Figure 4 shows graphically the variations of supercharge pressure and also of torque with engine speed for a single main engine of the power plant of Figures 1 to 3.

Figure 1 represents diagrammatically a plan view of a railway locomotive driven by a power plant comprising four main compression ignition internal combustion engines 60a, 60b, 60c, and 60d. These engines drive the sun wheels of two differential gears, as described in application No. 793,903 through variable-filling fluid couplings 102a, 102b, 102c and 102d respectively. The differential gears and also the gears for transmitting the output thereof to the wheels of the locomotive are housed in a gear box 103. In this housing are a third differential gear the sun wheels of which are driven by the planet carriers of the two aforesaid differential gears, and a reversible transmission gear driven by the planet carrier of the third differential gear for transmitting the drive to the wheels of the locomotive. The shafts connecting the several main engines with their fluid couplings are all denoted by the reference numeral 104, and those connecting the fluid couplings with the gear box by the numeral 105.

Mounted on the gear box 103 are two auxiliary compression ignition internal combustion engines 62x and 62y. These engines drive blowers 61x and 61y respectively, the outputs of which are passed to a common manifold system 66 which is connected with the inlet manifolds of the several main engines and is provided with aftercoolers 83a, 83b, 83c and 83d.

Starter motors 170a, 170b, 170c and 170d are provided for starting the main engines.

As described in application No. 793,903 each of the sun wheels driven by the shafts 105 is provided with a unidirectional device 109a, 109b, 109c or 109d which permits the sun wheel to rotate in one direction but not in the other.

The operation of the power plant is regulated by a number of control members which are actuated by the manual control levers 122a, 122b, 122c and 122d and a regulator 121 arranged in a control set 120f, mainly through the medium of a vacuum.

Four similar manual control levers and a regulator are arranged at the other end of the locomotive in a control set 120r, and since they function in the same manner in regulating the power plant they are not described in detail; they are provided to permit control of the locomotive from either end.

The control members of the plant relevant to the present invention are as follows:

1. Governors and associated mechanism in casings 1a, 1b, 1c, and 1d for regulating the fuel supply of the several main engines (see Figure 3 and description thereof below). Associated with each governor is a vacuum-actuated cut-off member 3a, 3b, 3c or 3d.

2. Scoop control members 112a, 112b, 112c, and 112d, for regulating the filling of the fluid couplings 102a, 102b, 102c, and 102d. The scoop control members are actuated by vacuum in such a manner that the application of a vacuum causes the associated fluid coupling to fill.

3. Boost control valves 67x and 67y which are arranged, when vacuum is released, to allow the supercharging air for the main engines to blow off to a predetermined pressure slightly above atmospheric.

Vacuum is supplied to the several control members described above through a system of pipes from a vacuum reservoir 118 connected in known manner with the train pipe 119 through a non-return valve. The system of pipes for distributing the vacuum is clearly shown in the drawings and is not specifically described except where this is necessary to the description of the control system. For the sake of clarity, each of the vacuum pipes is shown in Figure 1 as a single line. This figure, as stated above, is diagrammatic, and is intended to illustrate the general relationship between the control means for the main engines and the manual controls and not the relative spatial distribution, size or manner of mounting of the several parts.

The control of the vacuum is exercised through the manual control levers 122a, 122b, 122c and 122d and associated valves in a manner which is described in more detail in copending application No. 113,369 filed August 31, 1949, by L. F. R. Fell. Here it suffices to state that the control levers 122a, 122b, 122c and 122d permit pipes 136a, 136b, 136c and 136d respectively to be put into communication with the vacuum reservoir 118 or with the atmosphere.

The pipes 136a, 136b, 136c and 136d are connected respectively with the vacuum-actuated cut-off members 3a, 3b, 3c and 3d of the main engine governors, and with the filling control members 112a, 112b, 112c and 112d of the fluid couplings.

A valve 152 is provided which is actuated by the regulator 121. The valve 152 has only two ports, communicating with pipes 153 and 154 respectively. The valve plate has a slot which in one position of the plate connects the two ports with each other and in the other position cuts off this connection. The pipe 153 is connected directly with the vacuum reservoir 118 and the pipe 154 branches to certain of the vacuum-actuated controls as indicated in copending application No. 113,369, which include the boost control valves 67x and 67y. The valve 152 is actuated by the regulator 121 through shaft 130f, bevel gear 155f, shaft 156, lever 157 fixed to the shaft 156, and a link as described in copending application No. 113,369. Shaft 156 passes through the locomotive to the set of controls at the opposite end where it is likewise connected with the regulator at that end through bevel gears 155r and shaft 130r.

The principal function of the regulator 121 is to control the governors within the casings 1a, 1b, 1c, and 1d which govern the supply of fuel to the main engines. In the case of governor 1b, this control is exercised through bevel gears 159f and shaft 160f. Shaft 160f carries a chain sprocket 161f, which drives a chain sprocket 162f through a chain 163f, thus controlling the governor in casing 1a. Governors in casings 1c and 1d are controlled in like manner through shaft 156, bevel gears 159r, shaft 160r, chain sprockets 161r and 162r, and chain 163r.

Figure 2 shows a power plant having a main compression ignition engine 60, an independent auxiliary engine 62, a blower 61 driven by the auxiliary engine 62 and control means indicated generally by the reference 1 which imparts control movements to the pump rack 58 of the fuel injection pump 50 of the engine 60.

The blower 61 delivers air under pressure into the manifold 66 whence it reaches the main engine 60 after passing through an after-cooler 83. Pressure in the manifold 66 is controlled by boost control valve 67. It will be appreciated that components 1, 60, 61, 62, 67 and 83, referred to above in connection with Figure 2 correspond to the components having similar reference numerals, together with certain suffixed letters, in Figure 1 although the relative size and positions of the components have been altered to some extent in Figure 2 as compared with Figure 1.

The starter motor 170 is provided for the main engine 60 and operates by engaging a pinion 171 with a toothed ring 172 on the main engine flywheel 173 in a manner well known in connection with internal combustion engines on vehicles. The motor 170 is energized from battery 174 through a manually operated double switch 175, the circuit being completed through earth connections 176 and 177. Closing of the double switch 175 also energizes a solenoid 26, the circuit being completed through earth connection 178; the function of the solenoid 26 is described below.

Referring now to Figure 3, wherein any reference numeral corresponding to a reference numeral on Figure 1 but without the suffixed letters, indicates any one of the several such components shown in Figure 1 and distinguished in Figure 1 by suffixed letters, the control means is shown within the casing 1 which houses or supports the following components:

A centrifugal governor 2, a vacuum operated device 3, a manual control lever 5 which is connected to and moves with the regulator 121 or a corresponding shaft carrying sprocket 162f, 162n or 161r (see Figure 1), a starting device which comprises solenoid 26 and core 25 and a linkage by means of which movements of one or more of these components is imparted to the fuel rack 58 which is connected to the control means through a rod 7. The arrangement is such that movement of the rack 58 towards the left increases fuel injection.

The manual control lever 5, as shown in Figures 2 and 3, is provided with a toothed arc and pawl to indicate diagrammatically that the manual control may be moved to, and remain in, any selected position. The positions marked "Full," "Slow Running" and "Idle" correspond to the regulator positions marked respectively "Fast," "Slow" and "Idling" in application No. 113,369. In an arrangement such as that shown in Figure 1, a toothed arc and pawl or equivalent device is provided only for the regulators.

The centrifugal governor 2 is driven by the main engine at any suitable speed ratio and is designed to produce substantially equal displacements of the spring pad 53 for equal changes in engine revolutions. This is achieved by arranging that, as the moment of the force exerted by the weights 51 about pivots 52 decreases, the effective component of the force acting on the pad 53 increases.

The vacuum operated device 3 comprises a flexible diaphragm 9 working within a chamber 10 which is connected by means of a port 11 to one of the pipes 136a, 136b, 136c or 136d of the vacuum control system shown in Figure 1, by means of which a vacuum will be applied to the right-hand side of the diaphragm when the transmission gearing has been set to take a load by filling the fluid couplings 102a, 102b, 102c and 102d. The result of this is to displace the diaphragm 9 to the right as shown together with a rod 12, against the action of a spring 13, to the limits set by a stop 153 on the rod 12 and a guide 54. Movement to the left under the action of the spring 13 is limited by a stop 55 on the rod 12 and the guide 54, as may be appreciated from the drawing.

The linkage which imparts movement to the rod 7 comprises a lever 14 pivotally mounted on the rod 12, a cam 15 so mounted on a pivot 4 that it can be turned by movement of the link 8 and a rocking bar 16 pivoted at one end to a rod 17, at the other to the rod 7 and carrying a cam follower 19 mounted on a pin 20 and engaging the cam 15.

In addition there is a rod 24, which engages the lower end of the manual control lever 5.

The lever 14 is under the influence of a spring 21, one end of which is secured to the rod 12, so that this spring always tends to turn the lever 14 in a clockwise direction as shown in Figure 3. Flats 22 and 23 are formed on the lever 14 and engage one end of rod 17 and one end of the rod 24 respectively.

The rod 17 is normally urged to the left, as shown in Figure 3, to the limit permitted by a shouldered part 38 of the casing 1 and an adjustable collar 39 secured to the rod 17, by a spring 28 on the pump rack 58 acting through the rocking bar 16 and rod 7, and carries the magnetic core 25 which is arranged to be influenced by current in the solenoid 26. The arrangement is such that the solenoid is energized when the starter motor circuit (Figure 2) for the main engine of the power plant is energized as described above, and can then move the core 25 and rod 17 to the right against the action of the spring 28, to the limit set by a stop 56 on rod 17 against the inner end of a tubular guide extension of part 38 of casing 1. The spring 28 normally maintains engagement of the left hand end of the rod 17 with the flat 22 of the lever 14. The adjustable collar 39 permits the idling setting of the pump rack 58 to be adjusted.

The rod 7 is connected to the pump rack 58 through a coupling comprising a cylindrical casing 31, a piston-like member 30 and a spring 32 abutting against the member 30 and casing 31. The strength of the spring 32 is such that the rod 7 and rack 58 normally function as a single rigid member; i. e. the spring 32 is only compressed when the engine is stopped by moving a hand lever 33 to the left to thrust the pump rack 58 to the right by virtue of the engagement of the toe 34 of the lever 33 with a nut 35 on the rack 58. (Manual operation of the lever 33 represents an individual control for the main engine described, whereas, in a multiple engine power plant, such as shown in Figure 1, all the rods 24 move in unison under the general control of the regulator 121 when running normally on all engines, as will be appreciated from the arrangement shown in Figure 1.)

The lever 33 is pivoted to a rod 94 secured to a piston 90 which works in a cylinder 91 connected by conduit 92 with the blower 61 so that the piston 90 is subjected to the pressure of the supercharging air; the piston 90 is also subjected to the action of calibrated springs 93 and 95. The piston 90 takes up a position depending upon the pressure of the supercharging air, and moves the lever 33 and its toe 34 to limit the movement of the fuel rack 58 in accordance with the air available to the main engine 60.

The profile of the cam 15 is so formed, having regard to the dimensions of the fuel injection pump and the B. M. E. P./R. P. M. characteristics of the engine that it moves the rod 7 in such a manner that torque falls as engine speed increases.

The contour of the cam 15 may be plotted by measuring the fuel rack position from a suitable datum, at various main engine speeds and the desired torque at each speed. The desirable speed-torque relationship of the main engine will vary with the type of duty for which the power plant is intended, and the power plant may be adapted to various types of duty by having various interchangeable cams.

Referring now to Figure 2, the air required for the main engine 60, is provided by the blower 61 driven by the auxiliary engine 62 controlled by the variable speed governor 63 which acts upon the pump rack (not shown) of a fuel pump 64 associated with the auxiliary engine 62.

The blower 61 as shown is driven at engine speed by the auxiliary engine 62, by virtue of its direct connection with a crankshaft extension 65.

The output from the blower 61 passes into the induction manifold 66 of the main engine 60. The mainfold 66 is provided with two spring loaded valves 67 and 68. An after-cooler 83 is arranged in the manifold 66, between the valve 67 and the main engine 60, to cool the air from the blower 61. The valve 68 is provided with a spring which is just strong enough to ensure valve seating. The valve 68 is required to open under atmospheric pressure if the pressure within the manifold 66 falls below atmospheric pressure.

The valve 67 is provided with a light spring 80 and also has its stem secured to a flexible diaphragm 81 forming one wall of a chamber 82 in which a vacuum may be established when the fluid couplings 102a, 102b, 102c and 102d are filled by the operation of the control levers 122a, 122b, 122c and 122d as described above. During normal running, therefore, the effect of the vacuum in the chamber 82 is to urge the valve 67 towards the closed position. The degree of vacuum, the effective areas of the valve 67 and diaphragm 81 and the force exerted by the spring 80 are such that the valve 67 will act as a relief valve when the manifold pressure reaches 10 lbs. per square inch gauge. When the main engine is idling the vacuum in the chamber 82 is destroyed and the valve 67 can then be opened by a pressure which has to overcome substantially only the force of the spring 80; this is arranged to be a pressure of from 1 to 1½ lbs. per square inch gauge.

With the arrangement of the valve 67 and the aftercooler 83 just described, the after cooler-system will remain relatively cool during main engine idling and will thus be better able to function at its maximum capacity during starting. Although the auxiliary engine 62 runs at a speed above its idling speed when the main engine 60 is idling (since the speed of the engine 62 depends on the pressure in manifold 66 as described below), it is running with a light load.

The speed of the auxiliary engine 62 increases as the pressure in the manifold 66 drops. For this purpose a pressure sensitive capsule 70 is provided. This capsule 70 is subjected to the pressure in the manifold 66 by means of a conduit 69 and as it contracts or expands with changing pressures, it moves a valve member 74 forming part of a hydraulic relay by means of which movements of the member 74 are followed by a piston 71 working in a cylinder 72. The piston rod 73 of the piston 71 is connected to the variable speed governor 63 and the effect of its movement is to displace the fulcrum of a rocking element which changes the engine speed at which the governor maintains control.

The auxiliary engine and the blower are capable of maintaining the maximum manifold pressure of 10 lbs. per square inch while the main engine is starting under load and at low main engine speeds, thus providing a high starting torque. As the main engine speed increases, however, the manifold pressure drops. If due to any cause, for example failure of the auxiliary engine to maintain sufficient speed, the blower output falls below the main engine requirements, the pressure in the manifold 66 may fall below atmospheric and in that event valve 68 will open automatically and allow the main engines to run with atmospheric induction. Fuel injection will then be appropriately limited by the movement of the piston 90 as described above.

When one blower 61 is provided to supply air for a pair of main engines, as shown for example in Figure 1, the arrangement is preferably such that the blower can maintain superatmospheric pressure in the manifold 66 until both engines are running at 1500 R. P. M. The pressure falls progressively from 10 lbs. gauge at 600 R. P. M. of the main engines to about 1 lb. gauge at 1500 R. P. M.

The functioning of the engine control system will now be described by reference to the procedure adopted in passing from the condition of having the main engine stationary to running it at full speed. (The associated auxiliary engine is started first, by any convenient procedure):

When the main engine 60 is stationary, the corresponding control lever 122 will be in such a position that there will be no vacuum applied to the chamber 10 so that the spring 13 will urge the rod 12 as far to the left as the guide 54 and stop 55 will allow. The lever 14 and spring 21 will then be in the position shown in broken lines.

The manual control lever 5 will be in the position shown in Figure 3 which corresponds to the "Idle" position of the regulator 121 so that the rod 24 will be moved to the left by the lever 14; with the lever 14 withdrawn to the left, the spring 28 will, by rotating the rocking bar 16 in an anti-clockwise direction, urge the rod 17 as far to the left as the collar 39 will permit; the lower end of the rocking bar 16, together with the rod 7, will be moved towards the right hand side of the drawing, i. e. to a position which causes the fuel pump to deliver slightly more fuel than is required for steady idle running.

When the engine starter motor 170 is energized by closing the switch 175 (Figure 2), the solenoid 26 is also energised and the core 25 and rod 17 are moved to the right hand side of the drawing as far as the stop 56 will permit. This moves the rod 7 and pump rack 58 to the left to give overload fuel injection during starting.

As soon as the current supply to the starter motor is stopped, the solenoid 26 is de-energised and the spring 28 again acts to move the rod 17 to the left and the rod 7 to the right, thus reducing the fuel injection when the engine is running. The governor 2 will also move the link 8 slightly and turn the cam 15 in an anti-clockwise direction to decrease fuel injection to that required for idling.

The regulator 121 and therewith the manual control lever 5 is now moved part way towards the "Full" position. The result of this movement is to displace the rod 24 and the lower end of the lever 14 to the right; the general position of the lever 14 however prevents this displacement from altering the engine speed. After this regulator movement has taken place, the associated control lever 122 for filling the fluid coupling can be operated, and this operation causes the associated fluid coupling 102 to be filled, and also applies a vacuum to the chamber 10 so that the rod 12 is moved as far to the right as the stop 153 and guide 54 will permit. The displacement of the rod 24 and lever 14 just mentioned now becomes effective to increase the engine speed. The power plant will now work against its load, which, together with the governor 2, will determine its speed. For a given load, this speed will increase as the manual control lever 5 moves towards the left hand side, corresponding to regulator movement to the "Full" position, thereby causing the main engine 60 to give more torque.

The contour of the cam 15 is abruptly changed as at 42 so that fuel injection is suddenly decreased and then cut off when the cam 15 is turned sufficiently to bring this part into contact with the roller 19. This arrangement is provided to prevent the main engine from running at a dangerously high speed.

Referring now to Figure 4, the results achieved by the control system of the present invention are here represented graphically. The portion a—b of the torque/engine speed curve represents unloaded running of the engine and corresponds to regulator positions between "Idle" and "Slow Running."

The portion b—c of the curve from 470 to 1400 R. P. M. represents the speed range of the engine over which full power is available; the high torque at the low speed end of this range will be noted.

The portion c—d of the curve represents the effect of the decreased fuel injection caused by the portion 42 of the cam 15 becoming operative;

here it is shown as producing cut off at 1400 R. P. M.

The effect of the centrifugal governor 2 is to move the cam 15 and produce the effect of moving the working point of the engine to the right or left along the torque/speed curve of Figure 4 according to speed increase or decrease.

The effect of the manual control 5 is to displace the whole curve upwards or downwards or in other words to determine the torque limits within which the engine will work.

The curve *xyz* represents the pressures set up in the manifold 66 by the blower 61 and clearly illustrates the maintenance of full supercharge pressure up to an engine speed well within the full power speed range.

Although, in general, only one main engine has been referred to in the foregoing description, it will be appreciated that the preferred power plant comprises four main engines and two auxiliary engines.

It will be appreciated that various modifications in the power plant described above are within the scope of the present invention as defined by the accompanying claims.

We claim:

1. A power plant comprising a main compression ignition engine, a blower driven by a power source independent of said main engine for supercharging said main engine, a fuel injection control member for said main engine, a speed sensitive device driven by said main engine, control means adapted to cause the torque of the main engine to rise as the speed decreases over running speed range of said main engine and arranged to act as an intermediary through which the influence of said speed sensitive device is applied to said fuel injection control member, said control means including a first element connected to and actuated by said speed sensitive device and a second element connected to and actuating said fuel injection control member and manual control means arranged to influence said fuel injection control member to determine the upper torque limit within which said main engine operates.

2. A power plant comprising a main compression ignition engine, a blower driven by a power source independent of said main engine for supercharging said main engine, a fuel injection control member for said main engine, a speed sensitive device driven by said main engine, a manual control for said main engine, control means adapted to cause the torque of the main engine to rise as the speed decreases over running speed range of the main engine and arranged to transmit the influence of said speed sensitive device and said manual control to said fuel injection control member said control means including a first element connected to and actuated by said speed sensitive device and a second element connected to and actuating said fuel injection control member.

3. A power plant comprising a main compression ignition engine, a blower driven by a power source independent of said main engine for supercharging said main engine, a fuel injection control member for said main engine, a speed sensitive device driven by said main engine, manual control means for said main engine, control means including a cam formed in accordance with a torque/speed curve of said main engine when operating to give rising torque with falling speed over the running speed range of said main engine, said control means being actuated by said manual control and by said speed sensitive device independent of the manual control to transmit the influence of said speed sensitive device and of said manual control to said fuel injection control member.

4. A power plant comprising a main compression ignition engine, a blower driven by a power source independent of said main engine for supercharging said main engine, a fuel injection control member for said main engine, a speed sensitive device driven by said main engine, a manual control for said main engine, a control means for influencing said fuel injection control member in accordance with the operation of said speed sensitive device and/or said manual control means, said control means including a cam formed in accordance with a torque/speed curve of said main engine when operating to give rising torque with falling speed over the running speed range of said main engine, and operatively disposed intermediate the speed sensitive device and the fuel injection control member to transmit the movements of the speed sensitive device to the fuel injection control member, and means to ensure that fuel injection to said main engine shall not exceed a predetermined maximum in relation to the air available to said main engine.

5. A power plant comprising a main compression ignition engine, a blower driven by a power source independent of said main engine for supercharging said main engine, a fuel injection control member for said main engine, a centrifugal governor driven by said main engine and arranged to give substantially equal movements of the governor pad for equal changes of main engine speed, a manual control for said main engine and control means actuated by the manual control and the governor independent of the manual control for operating said fuel injection control member in accordance with the operation of said governor and/or said manual control means, said control means including a cam formed in accordance with a torque/speed curve of said main engine when operating to give rising torque with falling speed over the running speed range of said main engine.

6. A power plant comprising a main compression ignition engine, a blower driven by a power source independent of said main engine for supercharging said main engine, a fuel injection control member for said main engine, a speed sensitive device driven by said main engine, a manual control for said main engine, a control means for influencing said fuel injection control member in accordance with the operation of said speed sensitive device or said manual control means, said control means including a cam actuated by the speed sensitive device and formed in accordance with a torque/speed curve of said main engine when operating to give rising torque with falling speed over the running speed range of said main engine, and means to give overload fuel injection for starting said main engine.

7. A power plant comprising a main compression ignition engine, a blower driven by a power source independent of said main engine for supercharging said main engine, a fuel injection control member for said main engine, a speed sensitive device driven by said main engine, a manual control for said main engine, a control means actuated by the manual control and by the speed sensitive device independent of the manual control for influencing said fuel injection control member in accordance with the operation of said speed sensitive device and/or said manual control means, said control means including a cam connected to the speed sensitive device to transmit movement of the speed sensitive device to the fuel injection control member formed in accordance with a torque/speed curve of said main engine when operating to give rising torque with falling speed over the running speed range of said main engine, an element sensitive to the starting conditions of said main engine to operate said fuel injection control member during starting of the main engine to provide overload fuel injection during starting of said main engine.

8. A power plant comprising a main compression ignition engine, a blower driven by a power source independent of said main engine for supercharging said main engine, transmission means associated with said main engine, a fuel injection control member for said main engine, a governor driven by said main engine, a manual control for said main engine, a control means for influencing said fuel injection control member in accordance with the operation of said governor and/or said manual control means, said control means including a cam formed in accordance with a predetermined torque/speed curve of said main engine, and means to prevent said manual control means from being effective to influence said fuel injection control member until after said transmission means have been rendered operative to transmit power from said main engine.

9. A power plant comprising a main compression ignition engine, a blower driven by a power source independent of said main engine for supercharging said main engine, a fuel injection control member for said main engine, a speed sensitive device driven by said main engine, a manual control for said main engine, a control means actuated by said manual control and operated by the speed sensitive device independent of the manual control for influencing said fuel injection control member in accordance with the operation of said speed sensitive device and/or said manual control means, said control means including a cam operatively disposed intermediate the speed sensitive device and the fuel injection control member and formed in accordance with a torque/speed curve of said main engine when operating to give rising torque with falling speed over the running speed range of said main engine and an overriding manual control to cut off the fuel injection to said main engine irrespective of the condition of said control means.

10. A power plant comprising a main compression ignition engine, a blower driven by a power source independent of said main engine for supercharging said main engine, a fuel injection control member for said main engine, a speed sensitive device driven by said main engine, a manual control for said main engine, a control means for influencing said fuel injection control member in accordance with the operation of said speed sensitive device and/or said manual control means, said control means including a cam shaped over one portion of its contour in accordance with a torque-speed curve of said main engine when operating to give rising torque with falling speed over the running speed range of said main engine and shaped over another portion of its contour to move said fuel injection member to cut off fuel injection at a predetermined maximum main engine speed, said cam being operatively disposed intermediate the speed sensitive device and the fuel injection control member to transmit movement of the speed sensitive device to the fuel injection control member.

11. A power plant comprising a main compression ignition engine, a blower driven by a power source independent of said main engine for supercharging said main engine, a fuel injection control member for said main engine, a speed sensitive device driven by said main engine, a manual control for said main engine, a control means for influencing said fuel injection control member in accordance with the operation of said speed sensitive device and/or said manual control means, said control means including a cam formed in accordance with a torque/speed curve of said main engine when operating to give rising torque with falling speed over the running speed range of said main engine and connected to and operated by said governor, a rocking bar, a cam follower mounted between the extremities of said rocking bar and contacting said cam, a first member operatively connecting one extremity of said rocking bar to said fuel injection control member and a second member operatively connecting the other extremity of said rocking bar to said manual control.

12. A power plant comprising a main compression ignition engine, a blower driven by a power source independent of said main engine for supercharging said main engine, transmission means associated with said main engine, a fuel injection control member for said main engine, a governor driven by said main engine, a manual control for said main engine, a control means for influencing said fuel injection control member in accordance with the operation of said governor and/or said manual control means, said control means including a cam formed in accordance with a predetermined torque/speed curve of said main engine and arranged to be turned by the operation of said governor, a rocking bar, a cam follower mounted between the extremities of said rocking bar and contacting said cam, a first member operatively connecting one extremity of said rocking bar to said fuel injection control member and a second member pivotally connected to the other extremity of said rocking bar and subject to the influence of said manual control and of said transmission means.

13. A power plant comprising a main compression ignition engine, a blower driven by a power source independent of said main engine for supercharging said main engine, starting means and transmission means associated with said main engine, a fuel injection control member for said main engine, a centrifugal governor driven by said main engine and arranged to give substantially equal movements of the governor pad for equal changes in main engine speed, a manual control for said main engine, a control means for influencing said fuel injection control member in accordance with the operation of said governor and/or said manual control means, said control means including a cam formed in accordance with a predetermined torque/speed curve of said main engine and arranged to be turned by the operation of said governor, a rocking bar, a cam follower mounted substantially at the middle of said rocking bar and contacting said cam, yielding means for operatively connecting one extremity of said bar with said fuel injection control member and a second member operatively connected to the other extremity of said rocking bar and subject to the influence of said manual control, said starting means and said transmission means.

14. A power plant comprising a main compression ignition engine, a blower driven by a power source independent of said main engine for supercharging said main engine, transmission means associated with said main engine, a fuel injection control member for said main engine, a speed sensitive device driven by said main engine, manual control for said main engine, a control means for influencing said fuel injection control member in accordance with the operation of said speed sensitive device and/or said manual control means, said control means including a cam formed in accordance with a predetermined torque/speed curve of said main engine, and means to prevent said manual control means from being effective to influence said fuel injection control member until after said transmission means have been rendered operative to transmit power from said main engine.

15. A power plant comprising a main compression ignition engine, a blower driven by a power source independent of said main engine for supercharging said main engine, transmission means associated with said main engine, a fuel injection control member for said main engine, a speed sensitive device driven by said main engine a manual control for said main engine, a control means for influencing said fuel injection control member in accordance with the operation of said speed sensitive device and/or said manual control means, said control means including a cam formed in accordance with a predetermined torque/speed curve of said main engine and arranged to be turned by the operation of said speed sensitive device, a rocking bar, a cam follower mounted between the extremities of said rocking bar and contacting said cam, a first member operatively connecting one extremity of said rocking bar to said fuel injection control member and a second member pivotally connected to the other extremity of said rocking bar and subject to the influence of said manual control and of said transmission means.

LOUIS FREDERICK RUDSTON FELL.
RICHARD JOSEPH WALSH COUSINS.

REFERENCES CITED

The following references are of record in the file of this patent:

UNITED STATES PATENTS

| Number | Name | Date |
|---|---|---|
| 2,349,937 | Buchhart | May 30, 1944 |
| 2,362,655 | Mallory | Nov. 14, 1944 |
| 2,377,256 | Mallory | May 29, 1945 |
| 2,382,707 | Gosslan et al. | Aug. 14, 1945 |
| 2,403,398 | Reggio | July 2, 1946 |